United States Patent
Jandt et al.

(10) Patent No.: US 8,478,014 B2
(45) Date of Patent: Jul. 2, 2013

(54) APPARATUS FOR GENERATING AN IMAGE OF MOVING OBJECT

(75) Inventors: Uwe Jandt, Hamburg (DE); Dirk Schaefer, Hamburg (DE); Michael Grass, Buchholz In der Nordheide (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 242 days.

(21) Appl. No.: 12/990,817

(22) PCT Filed: May 5, 2009

(86) PCT No.: PCT/IB2009/051835
§ 371 (c)(1),
(2), (4) Date: Nov. 3, 2010

(87) PCT Pub. No.: WO2009/136360
PCT Pub. Date: Nov. 12, 2009

(65) Prior Publication Data
US 2011/0058723 A1 Mar. 10, 2011

(30) Foreign Application Priority Data
May 9, 2008 (EP) ..................................... 08155961

(51) Int. Cl.
*G06K 9/00* (2006.01)

(52) U.S. Cl.
USPC .......................................................... 382/131

(58) Field of Classification Search
None
See application file for complete search history.

(56) References Cited

U.S. PATENT DOCUMENTS

| | | | | |
|---|---|---|---|---|
| 6,289,135 B1 * | 9/2001 | Declerck et al. | ............... | 382/276 |
| 7,630,751 B2 * | 12/2009 | Boese et al. | ................... | 600/407 |
| 8,014,489 B2 * | 9/2011 | Oshima | ............................. | 378/8 |
| 8,315,452 B2 * | 11/2012 | Bartal et al. | ................... | 382/131 |
| 2003/0152195 A1 | 8/2003 | Hebecker et al. | | |
| 2005/0203373 A1 | 9/2005 | Boese et al. | | |
| 2008/0267480 A1 * | 10/2008 | Nielsen et al. | ................. | 382/131 |
| 2010/0266182 A1 * | 10/2010 | Grass et al. | .................... | 382/131 |
| 2010/0295846 A1 * | 11/2010 | Schaefer et al. | .............. | 345/419 |

OTHER PUBLICATIONS

Hautvast et al: "Automatic Contour Propagation in Cine Cardiac Magnetic Resonance Images" IEEE Transactions on Medical Imaging, IEEE Service Center, Piscataway, NJ, US, vol. 25, No. 11, Nov. 1, 2006, pp. 1472-1482, XP011149829.*

(Continued)

*Primary Examiner* — Nancy Bitar

(57) ABSTRACT

The present invention relates to an apparatus for generating an image of a moving object, wherein a movement of the object comprises a multiple of moving phases. The apparatus comprises a measured detection data providing unit (20) for providing measured detection data of the moving object, which have been detected by using a detection process and which are assigned to the moving phases. The apparatus comprises further a reconstruction unit (13) for reconstructing an image object of the object from the provided measured detection data and an adaptation unit (18) for adapting the image object for different moving phases such that simulated detection data are adapted to the measured detection data of the respective moving phase, wherein the simulated detection data are determined by simulating the detection process, which has been used for detecting the measured detection data assigned to the respective moving phase, with the image object.

9 Claims, 7 Drawing Sheets

OTHER PUBLICATIONS

Lorensen et al: "Marching Cubes: A High Resolution 3D Surface Construction Algorithm"; Computer Graphics, Jul. 1987, vol. 21, No. 4, pp. 163-169.

Sethian. J.: "Fast Marching Methods"; SIAMS Review, Jun. 1999, vol. 41, Issue 2, pp. 199-235.

Alim et al: "A New Method for Dynamic Road Mapping of Coronary Angiography Cardiac Catheterization Cine Loops"; 20th National Radio Science Conference, Mar. 18-20, 2003, Cairo, Egypt, pp. K4-1-K4-10.

Kachelriess et al: "ECG-Correlated Image Reconstruction From Subsecond Multi-Slice Spiral CT Scans of the Heart"; Med. Phys., Aug. 2000, vol. 28, No, 8, pp. 1881-1902.

* cited by examiner

APPARATUS FOR GENERATING AN IMAGE OF MOVING OBJECT

FIELD OF THE INVENTION

The present invention relates to an apparatus, a method and a computer program for generating an image of a moving object.

BACKGROUND OF THE INVENTION

In the article "ECG-correlated image reconstruction from subsecond multi-slice spiral CT scans of the heart" M. Kachelrieβ, S. Ulzheimer, and W. A. Kalender, Med. Phys. 27, 1881-1902, 2000 a computed tomography apparatus for acquiring projection data of a heart of a human being is disclosed, wherein an electrocardiogram is measured simultaneously such that the projection data can be assigned to different cardiac phases, i.e. to different moving phases of the heart. The projection data assigned to different moving phases are used for reconstructing an image of the heart, which shows the heart in the different moving phases, i.e. for each of the moving phases a three-dimensional image of the heart is reconstructed and these three-dimensional images are combined to a four-dimensional image showing the heart in different moving phases.

In order to reconstruct a three-dimensional image of the heart in different moving phases, for each moving phase projection data have to be acquired, which preferably fulfill the so-called sufficiency condition, i.e. each point of the heart, which has to be reconstructed, has to see the radiation source over an angular range of at least 180°. In order to fulfill the sufficiency condition for each point of the heart, which has to be reconstructed, and for each moving phase, a relatively large amount of projection data has to be acquired, which leads to a relative high radiation dose applied to the human being.

SUMMARY OF THE INVENTION

It is an object of the present invention to provide an apparatus, a method and a computer program for generating an image of a moving object, wherein the amount of exposure of the object to the detection process can be reduced, for example, the amount of a radiation dose applied to the object.

In a first aspect of the present invention an apparatus for generating an image of a moving object is presented, wherein the movement of the object comprises a multiple of moving phases, the apparatus comprising:

a measured detection data providing unit for providing measured detection data of the moving object, which have been detected by using a detection process and which are assigned to the moving phases, a reconstruction unit for reconstructing an image object of the object from the provided measured detection data, wherein the image object represents at least a part of the moving object, an adaptation unit for adapting the image object for different moving phases such that simulated detection data are adapted to the measured detection data of the respective moving phase, wherein the simulated detection data are determined by simulating the detection process, which has been used for detecting the measured detection data assigned to the respective moving phase, with the image object.

The invention is based on the idea that firstly an image object of the object is reconstructed, wherein this reconstruction can be any reconstruction, i.e. this reconstruction does not necessarily require measured detection data, which are sufficient for reconstructing an image object in each moving phase, and that this reconstructed image object is adapted to the different moving phases by simulating the detection process, which has been used for measuring the measured detection data assigned to the respective moving phase, with the reconstructed image object for generating simulated detection data of the respective moving phase and by adapting the image object such that the simulated detection data of the respective moving phase are adapted to the measured detection data of the respective moving phase. Thus, firstly an image object is reconstructed and secondly the reconstructed image object is adapted by adapting the simulated detection data to the measured detection data for the respective moving phase. Since this adaptation is performed for different moving phases, i.e. several adapted image objects are generated for different moving phases, the several adaptive image objects form an image of the object, which show the movement of the object, i.e. the several adapted image objects form an image of the moving object. If the image object is a volume object, the several adapted image objects form a four-dimensional image of the moving object. Thus, in accordance with the invention, an image of a moving object is generated, wherein the reconstruction unit does not need measured detection data, which are sufficient for reconstructing the object in each moving phase, i.e. a reduced amount of measured detection data is needed, which reduces the amount of exposure of the object to a detection process, for example, the amount of a radiation dose applied to the object.

The moving object is, for example, a moving heart of a human being or of an animal, wherein the heart comprises several cardiac phases, i.e. moving phases. Furthermore, the moving object can be any other moving object, for example, another moving organ of a human being or of an animal, like the lung, the kidney or the liver, or a moving technical object. The moving object is preferentially a periodically moving object.

The measured detection data providing unit is preferentially a computed tomography detection unit, which uses, in particular, a so-called C-arm. The computed tomography detection unit detects projection data of the moving object. In other embodiments, the measured detection data providing unit can be another imaging modality, which provides measured detection data, like a magnetic resonance imaging apparatus, an ultrasonic imaging apparatus or a nuclear imaging apparatus like a positron emission tomography apparatus or a single photon emission computed tomography apparatus. The measured detection data providing unit preferentially further comprises a motion determination unit for determining the moving phases of the moving object. The motion determination unit is, in a preferred embodiment, an electrocardiograph for measuring an electrocardiogram, which indicates different cardiac phases as the moving phases. The motion determination unit can also be or comprise a unit for determining respiratory motion of a human being or an animal, for example, by using a respiratory motion determination system using a respiratory motion determining belt surrounding the thorax of the human being or the animal. Furthermore, the motion determination unit can be a unit, which determines the motion from the provided measured detection data using a kymogram. The motion determination unit is preferentially used for determining, in which moving phase the respective provided measured detection data have been detected and for assigning the respective provided measured detection data to the respective moving phases. In another embodiment, the measured detection data providing unit can be a storage unit, in which the measured detection data of the moving object, which have been detected by using a detection process and which are assigned to the moving phases, are stored. Thus, in an embodiment, the measured detection data providing unit can be a storage unit, in which the measured detection data assigned to the moving phases are stored, wherein, in this embodiment, the unit for measuring the detection data and the unit for determining the motion of the moving object are not part of the apparatus for generating an image of a moving object, i.e. the apparatus for generating an image of a moving object can be a computer comprising the reconstruction unit and the adaptation unit and the storage unit for storing and providing the measured detection data assigned to the moving phases.

If the moving object is not periodically moving, the number of moving phases, to which measured detection data are assigned, is preferentially equal to the number of time points, at which the measured detection data have been detected. If the moving object is a periodically moving object, the number of moving phases, at which measured detection data are assigned, is preferentially equal to the number of time points during one motion period of the moving object, at which measured detection data are acquired. In another embodiment, a motion period of the moving object can be divided into a predefined number of moving phases, wherein the measured detection data are assigned to these predefined moving phases.

The image object can represent the whole object or a part of the object. In particular, the image object can represent a surface of the moving object, which can be a surface of an object of interest within the moving object or an outer surface of the moving object. The adaptation of the image object can be performed such that the whole image object is adapted or such that only a part of the image object, in particular, a surface of the image object is adapted.

In a preferred embodiment, the reconstruction unit is adapted for reconstructing the image object without considering the assignment of the provided measured detection data to the moving phases. Since the assignment of the provided measured detection data to the moving phases is not considered, it is, for example, not necessary to choose provided measured detection data, which correspond to the same moving phase, and to use for the reconstruction of the image object in a certain moving phase only provided measured detection data, which belong to the same respective moving phase. Thus, the amount of measured detection data, which are used for reconstructing this image object, is further reduced. For example, if the measured detection data are projection data of a computed tomography apparatus or of a C-arm apparatus, measured detection data covering an angular range of 180° are preferentially needed only for reconstructing the image object.

It is further preferred that the apparatus further comprises a measured detection data median filtering unit for median filtering the measured detection data. This reduces the noise of the measured detection data and, thus, increases the quality of the generated image of a moving object.

In a preferred embodiment, the median filtering unit is a block median filter comprising a 3×3 or 5×5 pixel kernel. For each detector element, the detection data values around it within a 3×3 or 5×5 block are sorted and their median is used to replace the original detection data value of the respective detector element.

It is further preferred that the apparatus comprises an image object filtering unit for median and/or low-pass filtering the image object. The low-pass filter is preferentially a Gaussian filter. The median and/or low-pass filtering of the image object reduces noise and streak artifacts and therefore further improves the quality of the image of the moving object.

Preferentially, the image median filtering unit is a block median filter comprising a 5×5×5 volume element (voxel) kernel. For each voxel within the image object, the voxel elements around it within a 5×5×5 block are sorted and their median is used to replace the original voxel value at the current position. The low pass filter is preferably implemented using a Gaussian kernel, i.e. for each voxel within the image object, the voxel elements around it within a predefined block size are convoluted with a 3D Gauss kernel and the result replaces the original voxel value at the current position.

In a preferred embodiment, the apparatus further comprises a segmentation unit for segmenting a surface of the image object, wherein the adaptation unit is adapted for adapting the image object by adapting the segmented surface of the image object. The segmented surface is preferentially a surface of an object of interest within the moving object. The segmentation is preferably performed by firstly performing a volume segmentation of the object of interest, for example, by using a fast marching method, which is, for example, disclosed in J. Sethian, "Fast marching methods," SIAM Review, vol. 41, no. 2, pp. 199-235, 1999, and by triangulating the surface of the volume segmented object of interest. The triangulation is preferentially performed by using the marching cubes algorithm, which is, for example, disclosed in W. Lorensen and H. Cline, "Marching cubes: A high resolution 3D surface construction algorithm," ACM SIGGRAPH, 21(4), July 1987. The fast marching method starts at a seed point within the image object, which is preferentially determined as a maximum value of the image object. Starting from the seed point the volume, which has to be segmented, grows in different directions using a so-called speed function, which is preferentially adapted such that the growing in a direction is faster, if the values of the image object are larger in this direction. A more detailed description of the fast marching method is given in the above mentioned article. If the moving object is a moving heart of a human being or of an animal, the object of interest of the image object is preferentially a vascular structure or a heart chamber, in particular, ventricles and/or arteria, wherein preferentially a contrast agent is present in these objects of interest.

It is further preferred that the measured detection data are measured projection data, wherein the adaptation unit is adapted for performing following steps for different moving phases:

simulating the detection process by forward projecting the image object, wherein simulated detection data are determined, determining a forward projected surface of the image object in the simulated detection data, determining a contour in the measured projection data, adapting the image object such that the forward projected surface of the image object is adapted to the contour in the measured projection data. Preferentially the forward projected surface of the image object is a segmented surface of the image object. This allows to adapt the image object, in particular, the surface of the image object, i.e. in a preferred embodiment the segmented surface of the heart of a human being or an animal, which might be a segmented surface of an inner structure and/or of an object of interest of the heart, such that the forward projected surface is adapted to the contour in the measured projection data. This adaptation of the image object improves the quality of the generation of an image of the moving object.

Preferentially, the adaptation unit is adapted for determining a contour in the measured projection data by determining extremes of a gradient of the measured projection data, wherein the extremes form the contour. Preferentially, this extremes are determined along normals of the forward projected surface. This allows to determine a contour in the measured projection data with an improved quality and to therefore further improve the quality of the generation of an image of a moving object.

It is further preferred that the adaptation unit is adapted for determining a contour in the measured projection data and for adapting the image object such that the forward projected surface of the image object is adapted to the contour in the measured projection data by performing following steps:
a) determining extremes of the gradient of the measured projection data along several normals of the forward projected surface of the image object,
b) determining for each normal the extremum having the largest absolute value,
c) adapting the image object such that the forward projected surface of the image object is adapted to the determined extremes having the largest absolute value,
d) determining whether on a same normal a determined extremum has a smaller distance with respect to a distance measure, which depends on the geometrical distance of the respective extremum to the adapted forward projected surface, than the extremum having the largest absolute value, wherein, if this is the case, the adaptation of the image object such that the forward projected surface of the image object is adapted to the determined extremes is repeated, wherein the extremum having the largest absolute value is replaced by the extremum on the same normal having the smallest distance with respect to the distance measure. The distance measure is, for example, equal or proportional to the geometrical distance of the respective extremum to the adapted forward projected surface. This distance measure can also be a linear combination of the geometrical distance of the respective extremum to the adapted forward projected surface and the absolute value of the extremum or of the measured detection data value located at the position of the extremum.

This further improves the quality of the adaptation of the forward projected surface of the image object to the determined extremes and, thus, of the forward projected surface to the contour determined in the measured projection data. The forward projected surface is, preferentially, a forward projected segmented surface of the image object.

It is further preferred that the adaptation unit is adapted for
  adapting the image object for different moving phases such that at least two adapted image objects are obtained related to two different moving phases,
  determining an adapted image object for a moving phase, for which an adapted image object has not been determined, by averaging over the at least two adapted image objects.

This allows to determine an image of the moving object in a moving phase, in which an adaptation of the image object such that simulated detection data, which are determined by simulating the detection process with the image object, are adapted to the measured detection data of the respective moving phase, has not been performed. Thus, an image of the moving object can be determined in a moving phase, in which an adaptation such that simulated detection data are adapted to the measured detection data of the moving phase can not be performed or can not be performed with sufficient quality. Furthermore, it is not necessary to perform the adaptation in each moving phase, because in some moving phases an image of the moving object can be generated by averaging. This can reduce the computational costs.

In a further aspect of the present invention a method for generating an image of a moving object is presented, wherein the movement of the object comprises a multiple of moving phases, the method comprising following steps:
  providing measured detection data of the moving object, which have been detected by using a detection process and which are assigned to the moving phases, by a measured detection data providing unit,
  reconstructing an image object of the object from the provided measured detection data by a reconstruction unit, wherein the image object represents at least a part of the moving object,
  adapting the image object for different moving phases such that simulated detection data are adapted to the measured detection data of the respective moving phase, wherein the simulated detection data are determined by simulating the detection process, which has been used for detecting the measured detection data assigned to the respective moving phase, with the image object by an adaptation unit.

In a further aspect of the present invention a computer program for generating an image of a moving object is presented, wherein a movement of the moving object comprises a multiple of moving phases, the computer program comprising program code means for carrying out the steps of the method, when the computer program is run on a computer.

It shall be understood that the apparatus, the method and the computer program have similar and/or identical preferred embodiments as defined in the dependent claims.

It shall be understood that a preferred embodiment of the invention can also be any combination of the dependent claims with the respective independent claim.

BRIEF DESCRIPTION OF THE DRAWINGS

These and other aspects of the invention will be apparent from and elucidated with reference to the embodiments described hereinafter. In the following drawings

DETAILED DESCRIPTION OF EMBODIMENTS

Figure 1:
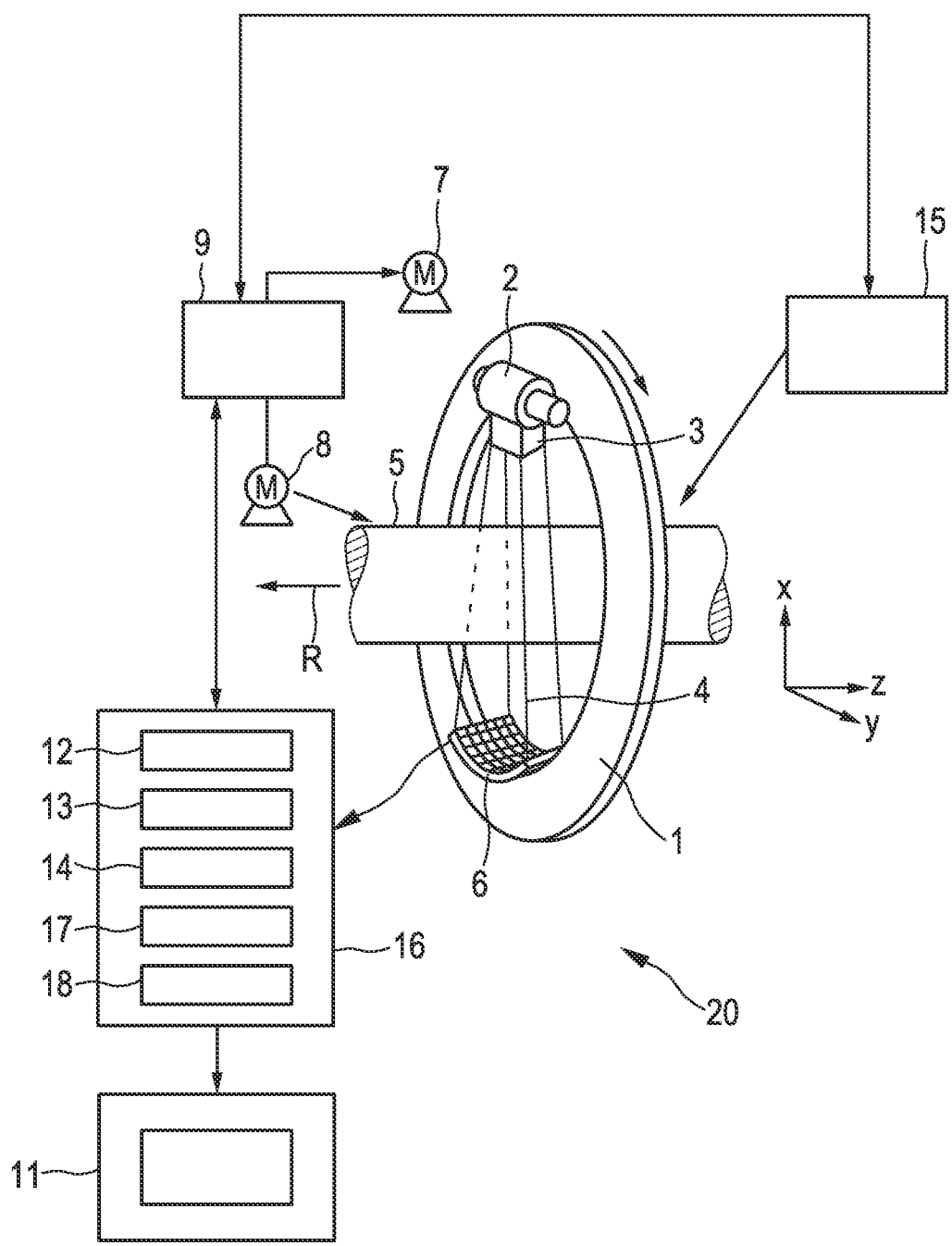
FIG. 1 shows schematically and exemplarily an apparatus for generating an image of a moving object.

FIG. 1 shows schematically and exemplarily an apparatus for generating an image of a moving object, wherein a movement of the object comprises a multiple of moving phases. The apparatus for generating an image of moving object is, in this embodiment, a computed tomography apparatus 20. The computer tomography apparatus 20 includes a gantry 1, which is capable of rotation around a rotational axis R which extends parallel to a z-direction. A radiation source 2 which is, in this embodiment, an X-ray tube, is mounted on the gantry 1. The radiation source 2 is provided with a collimator 3, which forms, in this embodiment, a conical radiation beam 4 from the radiation generated by the radiation source 2. The radiation traverses a region of interest, in particular, within a moving object like a heart of a human being or an animal, in an examination zone 5, which is, in this embodiment, cylindrical. The region of interest can contain a complete moving object like a complete heart of a human being or an animal, or the region of interest can contain only a part of the moving object. After having traversed the examination zone 5 and, thus, the region of interest, the radiation beam 4 is incident on a detection unit 6, which comprises a two-dimensional detection surface in this embodiment, the detection unit 6 is also mounted on the gantry 1.

The computed tomography apparatus comprises two motors 7, 8. The gantry is driven at a preferably constant but adjustable angular speed by the motor 7. The motor 8 is provided for displacing the region of interest, i.e. the moving object, which is, in this embodiment, arranged on a patient table within the examination zone 5, parallel to the direction of the rotational axis R or the z axis. These motors 7, 8 are controlled by a control unit 9, for instance, such that the radiation source and the examination zone and, thus, the region of interest within the examination zone 5 move relative to each other along a helical trajectory or a circular trajectory, which is preferred in this embodiment. In other embodiments, the radiation source and the examination zone can move along another trajectory, which ensures that the region of interest of illuminated from different directions. If the radiation source 2 rotates around the region of interest, the radiation source 2 and the region of interest move relative to each other along a helical trajectory, and if the region of interest is not moved and only the radiation source 2 is rotated around the region of interest, the radiation source 2 moves relative to the region of interest along a circular trajectory, i.e. the radiation source 2 and the region of interest move relative to each other along a circular trajectory.

In another embodiment, the collimator 3 can be adapted for forming another beam shape, in particular, a fan beam, and the detection unit 6 can comprise a detection surface, which is shaped corresponding to the other beam shape, in particular, to the fan beam, i.e., for example, the detection surface can comprise only one line of detection elements.

During a relative movement of the radiation source 2 and the examination zone 5, and, thus, the region of interest, the detection unit 6 generates measured detection data depending on the radiation incident on the detection surface of the detection unit 6.

The apparatus for generating an image of a moving object further comprises a motion determination unit 15 for determining the moving phases of the movement of the moving object, i.e., in this embodiment, for determining the cardiac phases. The motion determination unit 15 is, in this embodiment, an electrocardiograph. The electrocardiograph determines an electrocardiogram, which is transferred via the control unit 9 or directly to an image generation unit 16, such that the measured detection data can be assigned to different moving phases of the moving object. Also the measured detection data, which are, in this embodiment, projection data, are provided to the image generation unit 16 for generating an image of the region of interest of the moving object from the measured detection data, which are assigned to the respective moving phases, which are determined by the motion determination unit 15 during the acquisition of the measured detection data. The moving phases are determined by determining the motion periods of the moving object, which is in this embodiment a moving heart, and by determining the time points within a moving period, at which the measured detection data have been acquired. Preferentially, each of these time points within a moving period defines a moving phase. In other embodiments, several time points within a moving period can be combined to a moving phase. For example, a moving period can be divided in predefined number of time intervals, for example, into ten time intervals, wherein each of these time intervals defines a single moving phase.

During a relative movement of the radiation source 2 and the examination zone 5 the detection unit 6 generates measured detection data depending on the radiation incident on the detection surface of the detection unit 6. Furthermore, simultaneously, the motion determination unit 15, i.e., in this embodiment, the electrocardiograph, determines the moving phases of the object, i.e., in this embodiment, the cardiac phases, such that the measured detection data are assigned to different moving phases of the moving object. Therefore, the radiation source 2, the elements for moving the radiation source 2 relative to the examination zone, in particular, the motors 7, 8 and the gantry 1, the detection unit 6 and the motion determination unit 15 form a measured detection data providing unit 20 for providing measured detection data of the moving object, which have been detected by using a detection process and which are assigned to the moving phases. These measured detection data, which are assigned to the moving phases, are provided to the image generation unit 16.

The image generation unit 16 comprises a measured detection data median filtering unit 12 for median filtering the measured detection data, a reconstruction unit 13 for reconstructing an image object of the moving object from the filtered provided measured detection data, an image object filtering unit 14 for median and/or low-pass filtering the image object, a segmentation unit 17 for segmenting a surface of the image object and an adaptation unit 18 for adapting the image object for different moving phases such that simulated detection data are adapted to the measured detection data of the respective moving phase, wherein the simulated detection data are determined by simulating the detection process, which has been used for detecting the measured detection data assigned to the respective moving phase, with the image object.

The adapted image objects, which are generated for different moving phases, form the generated image of the moving object, which shows the movement of the moving object, i.e., if the reconstructed image object is a volume object, the generated image of the moving object is a four-dimensional image of the moving object. This image of the moving object is provided to a display unit 11 for displaying the generated image, i.e. for displaying the image object, which has been adapted for different moving phases.

Also the image generation unit 16 is preferably controlled by the control unit 9.

Figure 2:
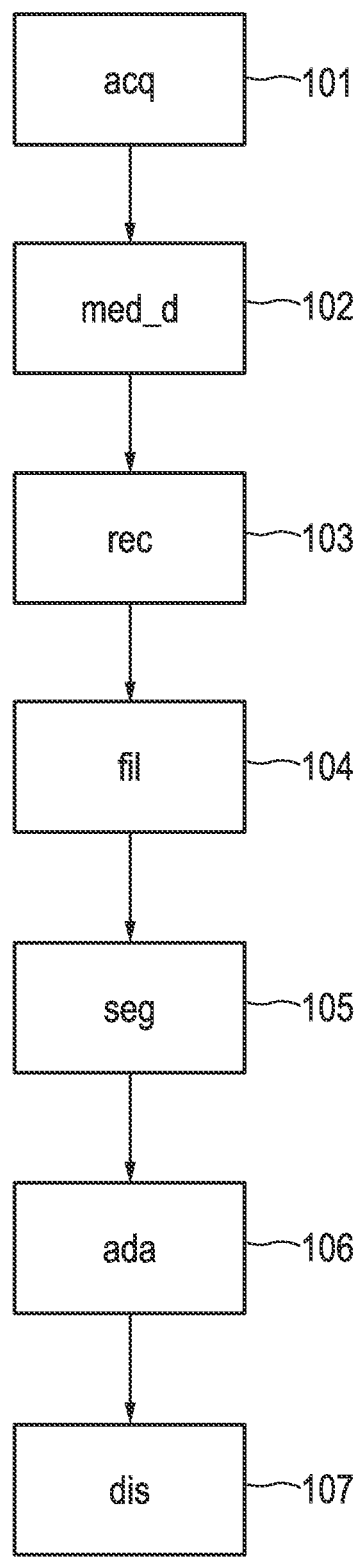
FIGS. 2 to 4 show flow charts illustrating exemplarily a method for generating an image of a moving object.

In the following a method for generating an image of a moving object will be described with reference to a flow chart shown in FIG. 2.

In step 101, the radiation 2 rotates around the rotational axis R and the examination zone 5 and, thus, the region of interest is not moved, i.e. the radiation source 2 travels along a circular trajectory around the region of interest. In another embodiment, instead of a circular trajectory another trajectory can be used, for example, a helical or linear trajectory. The radiation source 2 emits radiation, in this embodiment, conical radiation, traversing the region of interest, in which the moving object or a part of the moving object is present. The radiation, which has traversed a region of interest, is detected by the detection unit 6, which generates measured detection data.

During the acquisition of the measured detection data in step 101, in this embodiment, the motion determination unit 15 being, in this embodiment, an electrocardiograph, determines the moving phases of the moving object. In this embodiment, a heart of a human being or of an animal is present in the region of interest and is locally contrast enhanced by a contrast agent present in the heart and the motion determination unit 15 determines an electrocardiogram, which is related to the moving phases of the heart, i.e. the cardiac phases. Thus, the measured detection data can be assigned to the different moving phases, i.e., in this embodiment, to the cardiac phases, of the moving object.

The measured detection data and data describing the determined moving phases, i.e., in this embodiment, the electrocardiogram, are transferred to the image generation unit 16, which determines an image of the moving object, in this embodiment, a four-dimensional image of the moving object, from the measured detection data, which are assigned to the different moving phases, by using the data generated by the motion determination unit 15. Thus, in step 101 measured detection data of the moving object are provided, which are detected by using a detection process and which are assigned to the moving phases. In this embodiment, the detection process is defined by the trajectory, along which the radiation source and/or the region of interest move relative to each other.

In a preferred embodiment, step 101 is repeated with the moving object not being contrast enhanced. Thus, in this preferred embodiment, measured detection data are acquired, while the moving object is contrast enhanced, and further measured detection data are acquired, while the moving object is not contrast enhanced. The measured detection data and the further measured detection data are preferentially linearly combined to measured detection data, which are used in the further steps. This linear combination preferentially comprises a subtraction of the measured detection data acquired while the moving object was contrast enhanced and the further measured detection data acquired while the moving object was not contrast enhanced. This linear combination can reduce data distortions caused by unwanted background structures, which are, in particular, not part of the surface, which will be segmented further below.

In step 102, the detection data median filtering unit 12 median filters the measured detection data for reducing noise. The preferred variant of the median filtering unit is a block median filter comprising a 3×3 or 5×5 detector element kernel. For each detector element, the detection data values around it within a 3×3 or 5×5 block are sorted and their median is used to replace the original detection data value at the current position.

In step 103, the reconstruction unit 13 reconstructs an image object of the object from the measured detection data, which have been median filtered in step 102. In this embodiment, the measured detection data are projection data and the reconstruction unit 13 is adapted for performing a filtered back projection, wherein all projection data acquired in step 101 are used, without considering the assignment of the projection data to the moving phases of the object. Thus, an ungated reconstruction of the region of interest is performed by using a filtered back projection technique.

The reconstructed image object is median and low-pass filtered by the image object filtering unit 14. This median and low-pass filtering reduces noise and streak artifacts. Furthermore, this filtering suppresses motion artifacts and small structures. The low-pass filtering is preferentially performed by using a Gaussian filter. The preferred variant of the image median filtering unit is a block median filter comprising a 5×5×5 volume element (voxel) kernel. For each voxel within the image object, the voxel elements around it within a 5×5×5 block are sorted and their median is used to replace the original voxel value at the current position. The low pass filter is preferably implemented using a Gaussian kernel, i.e. for each voxel within the image object, the voxel elements around it within a predefined block size are convoluted with a 3D Gauss kernel and the result replaces the original voxel value at the current position.

The image object, which has been filtered in step 104, is segmented by the segmentation unit 17 in step 105. The segmentation is preferentially performed such that a surface of the image object is triangulated and a triangulated surface mesh is built, which represents an average state of the moving object, because during the reconstruction of the image object in step 103 the assignment of the measured detection data to the different moving phases has not been considered. Preferentially, the segmentation is performed by using a fast marching method, resulting in a binary volume representation, i.e. e.g. voxels inside the image object have another label than voxels outside the image object. The surface of this binary volume representation is triangulated and, thus, the surface mesh is built, which is preferably performed by a marching cubes algorithm. Preferentially, the surface of locally contrast enhanced vascular structures and/or heart chambers is extracted, e.g. preferentially a triangulated surface mesh is formed representing the surface of the left atrium and the pulmonary vein. In another embodiment, the segmentation unit is adapted for segmenting the left atrium/left ventricle surface.

In step 106, the image object is, for different moving phases, adapted such that simulated detection data are adapted to the measured detection data of the respective moving phase, wherein the simulated detection data are determined by simulating the detection process, which has been used for detecting the measured detection data assigned to the respective moving phase, with the image object. This means that for each moving phase an adapted image object is generated. These image objects for the multiple of moving phases form a four-dimensional image data set showing the movement of the object. This four-dimensional image data set is, in this embodiment, the generated image of the moving object, which is provided to the display unit 11 for displaying the generated image of the moving object in step 107.

Figure 3:
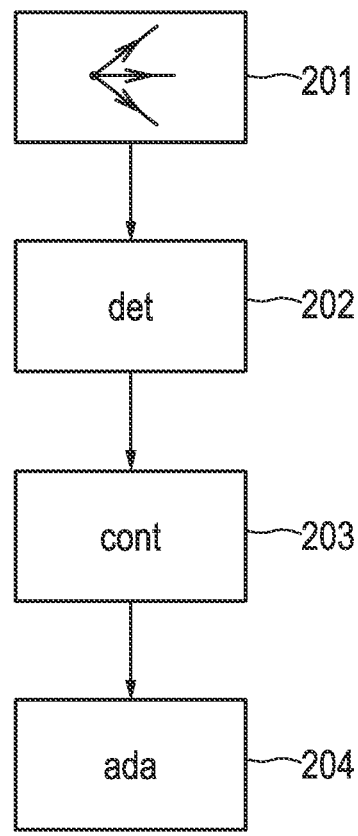

In the following the adaptation of the image object in step 106 will be described in more detail with reference to a flow chart shown in FIG. 3.

In step 201, the detection process is simulated by forward projecting the image object. In this embodiment, the surface of the image object, which has been segmented in step 105, is forward projected in order to simulate the detection process and to determine simulated detection data. For each position of the radiation source 2 relative to the examination zone 5, for which measured projection data have been acquired in step 101, corresponding simulated projection data are determined by simulating a forward projection through the image object, in particular, through the segmented surface of the image object, from the respective radiation source position onto the detection unit 6.

In step 202, the forward projected surface of the image object is determined in the simulated detection data. This determination can easily be performed, because the position of the surface of the image object in the image domain, the respective positions of the radiation source and the detection unit and the beam shape are known.

In step 203, a contour in the measured projection data is determined. It is supposed that a contour in the measured projection data corresponds to the forward projected surface of the image object in the corresponding simulated detection data. Therefore, in step 204, the image object is adapted such that the forward projected surface of the image object is adapted to the contour in the measured projection data.

The steps 201 to 204 are performed for different moving phases. Preferentially, the object is a periodical moving object and each time point within a moving period of the moving object, at which measured detection data have been acquired, is defined as a moving phase. In another embodiment the periodic movement of the object is divided into several moving phases, for example, into ten moving phases, which are uniformly distributed over a moving period and which have the same temporal width. Measured projection data, which belong to the same moving phase, are used for performing the steps 201 to 204. This is repeated for each moving phase, i.e. for the measured projection data, which have been assigned to the respective moving phase. Thus, for each moving phase the image object is adapted such that the forward projected surface of the image object is adapted to the contour in the measured projection data, resulting in an adapted image object for each moving phase. These adapted image objects form a moving image object being the generated image of the moving object. In particular, these adapted image objects form a four-dimensional image of the moving object, if the image object is a volume object.

Figure 4:
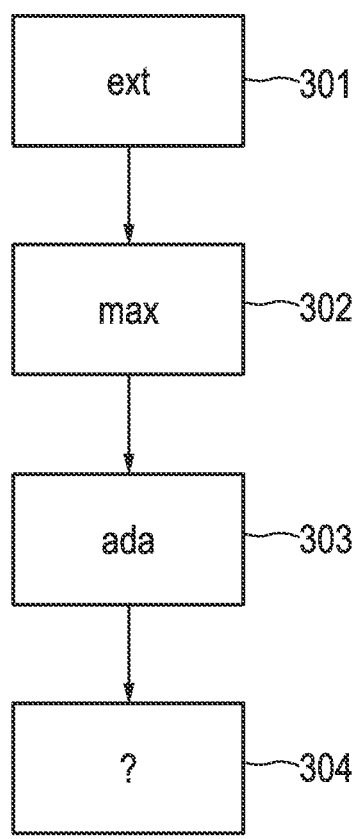

In the following, the determination of a contour in the measured projection data of step 203 and the adaptation of the image object such that the forward projected surface of the image object is adapted to the contour in the measured projection data of step 204, will be explained in more detail with reference to a flow chart shown in FIG. 4.

In step 301, the gradient of the measured projection data along several normals of the forward projected surface of the image object is calculated and extremes of this gradient along the several normals are determined. An example of such a determination of extremes of the gradient of the measured projection data along several normals is exemplarily shown in FIG. 5.

Figure 5:
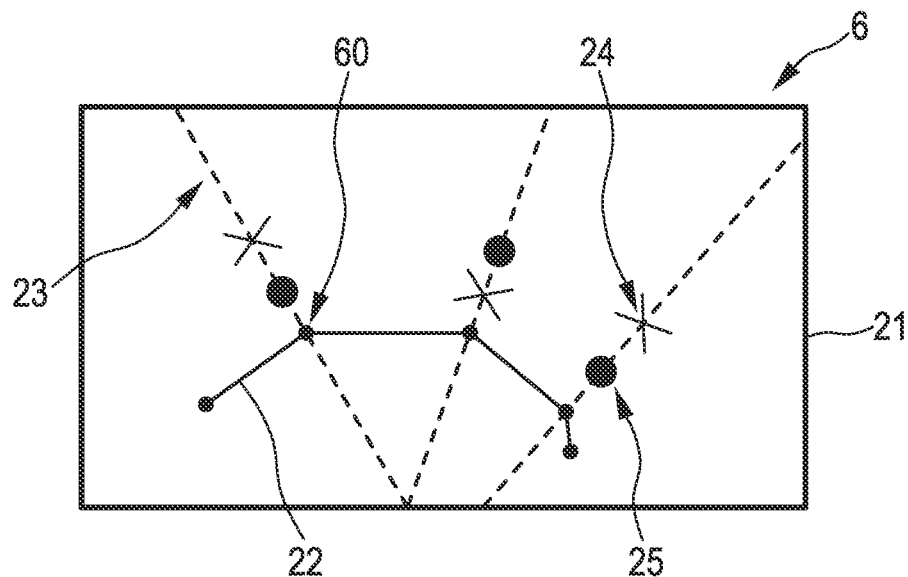
FIGS. 5 and 6 show schematically and exemplarily a forward projected surface of an image object, which is adapted to a contour formed by extremes of a gradient of measured detection data.

FIG. 5 shows schematically and exemplarily a detection surface 21 of the detection unit 6, on which measured projection data are detected and on which the segmented surface 22 has been forward projected. The segmented surface is, in this embodiment, formed by a surface mesh, which is, in particular, a triangulated surface mesh. Several normals 23 to the forward projected surface are determined and the gradients of the measured projection data along the normals 23 are calculated. In this embodiment, the normal is the normal of a forward projected vertex 60 of a forward projected triangulated surface mesh, wherein the normal of this vertex is an average of the normals belonging to the forward projected surfaces, which are joint by the respective vertex. In other embodiments, for each surface mesh element, in particular, for each triangle of the surface mesh, a normal is determined, wherein the normals can be located in the centre of the respective forwarded projected surface mesh element. The extremes of the gradient of the measured projection data along the normals are indicated by crosses 24 and circles 25.

In step 302, for each normal 23 the extremum 25 having the largest absolute value is determined. These extremes having the largest absolute value are indicated by circles in FIG. 5 and form a contour.

In step 303, the image object is adapted such that the forward projected surface 22 of the image object is adapted to the determined extremes 25 having the largest absolute value, i.e. to the determined contour. This is preferentially performed by back projecting the determined extremes 25 into the image space. The back projected extremes define a shift magnitude for every surface point that contributed to the forward projected surface in step 301. The shift magnitudes of surface points, in particular, of all surface points, are then regularized using a Gaussian low pass filter, which convolves the shift magnitudes of all surrounding surface points, if existent, and that of the currently considered surface point, resulting in a weighted and smoothed shift magnitude for the currently considered point. This procedure is repeated for several surface points, in particular, for every surface point, resulting in a consistent surface that is adapted to the back projected extremes.

Figure 6:
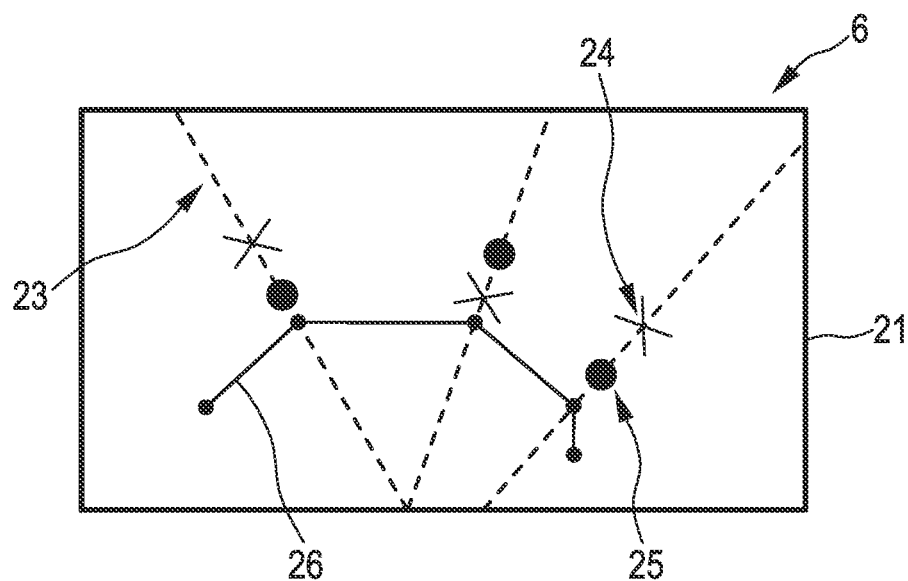

In step 304, it is determined whether on a same normal 23 a determined extremum 24 has a smaller distance to the adapted forward projected surface 26, which is schematically and exemplarily shown in FIG. 6, than the extremum 25 having the largest absolute value, wherein, if this is the case, the adaptation of the image object such that the forward projected surface of the image object is adapted to the determined extremes is repeated, wherein the extremum having the largest absolute value is replaced by the extremum on the same normal having the smallest distance to the adapted forward projected surface 26. Thus, the determination of the contour is corrected by replacing the extremum having the largest absolute value by the extremum having the smallest distance to the adapted forward projected surface 26. In the example shown in FIG. 6, the cross on the middle normal of the three normals 23 has a smaller distance to the adapted forward projected surface 26 than the circle on the same normal, which indicates the largest absolute value on this normal. Thus, in this example, the adaptation of the image object such that the forward projected surface of the image object is adapted to the determined extremes is repeated analog to step 303, wherein the image object is adapted such that the adapted forward projected surface 26 is adapted to the circles on the normals, which are shown on the left hand side and on the right hand side in FIG. 6, and to the cross on the middle normal of the three normals 23 shown in FIG. 6.

In an embodiment, steps 201 to 204 and 301 to 304 are not performed for each moving phase, but only for several moving phases, at least for two moving phases such that at least two adapted image objects are obtained.

If the adaptation of the image object has not been performed for all moving phases or if the adaptation is corrupted with noise, it is preferred that a modified image object is determined by averaging over adapted image objects, which have been adapted, in particular, in accordance with the steps 201 to 204 and 301 to 304. The adaptation is preferably performed using a temporal Gaussian low pass filtering method, i.e. a motion trajectory of each surface mesh point is preferentially convoluted with a Gauss kernel, forming a smoothed image, in particular, a smoothed four-dimensional image, showing the moving object.

After steps 201 to 204 and 301 to 304 have been performed, preferentially the adapted image object is forward projected for each moving phase for determining simulated detection data. Each simulated detection data value can be assigned to a ray, along which the forward projection has been performed for determining the respective simulated detection data value. Each simulated detection data value is compared with the respective measured detection data value and the width of the adapted image object along the corresponding ray, along which the respective forward projection has been performed, is modified such that the simulated detection data are adapted to the measured detection data.

In a preferred embodiment, in step 201, the detection process is simulated by forward projecting vertices of a triangulated surface mesh representing a surface of the image object. These forward projected vertices form a forward projected surface of the image object in the simulated detection data, which can thus be easily determined in the simulated detection data in step 202. In this embodiment the determination of a contour in the measured projection data in step 203 is performed by a determining normal for the vertices of the triangulated surface mesh representing the surface of the image object in the image space. A normal is determined for a vertex by averaging over the normals of the triangles, which belong to the respective vertex. These normals, which are determined for the vertices, are forward projected onto the measured detection data. In a preferred embodiment, normals, which are perpendicular to the detection surface of the detection unit or whose deviation from this perpendicular direction is smaller than a predefined angle, if they were forward projected, are not forward projected. This predefined angle is preferentially larger than 60°, further preferred larger than 70°, further preferred 80°, further preferred larger than 80°, and further preferred 85°. The gradient of the measured projection data along the forward projected normals is calculated and extremes of this gradient along the forward projected normals are determined. Then, for each forward projected normal, the extremum having the largest absolute value is determined. These extremes having the largest absolute value define a contour in the measured projection data, i.e. the contour is determined by determining their extremes. These determined extremes having the largest absolute value on the respective normal are back projected and the image object is adapted to the back projected extremes having the largest absolute value by adapting the vertices of the triangulated surface mesh to the back projected extremes having the largest absolute value.

Preferentially, this adaptation is performed by following procedure. The back projected extremes define a shift magnitude for every surface point that contributed to the forward projected surface. In an embodiment, not all surface points, i.e. e.g. vertices, contribute to the forward projected surface, but only surface points, which comprise a normal, which are not perpendicular to the detection surface of the detection unit, if they were forward projected. In a further embodiment, only surface points are forward projected, which comprise a normal, which deviate more than a given angle from a line perpendicular to the detection surface of the detection unit. This angle is preferentially 80°, further preferred larger than 80°, further preferred 85° and further preferred larger than 85°. The shift magnitudes of surface points, in particular, of all surface points, are then regularized using a Gaussian low pass filter, which convolves the shift magnitudes of all surrounding surface points, if existent, and that of the currently considered surface point, resulting in a weighted and smoothed shift magnitude for the currently considered point. This procedure is repeated for several surface points, in particular, for every surface point, resulting in a consistent surface that is adapted to the back projected extremes.

After this adaptation has been performed for the several moving phases, in particular, for each moving phase, it is determined whether on a same forward projected normal a determined extremum has a smaller distance to the adapted forward projected surface, i.e., in this embodiment, a smaller distance in the image space, which corresponds to a smaller distance in detection data space. If this is the case, the above described adaptation using the forward projected normals is repeated with extremes of the gradient on the forward projected normals, wherein an extremum having the largest absolute value is replaced by the extremum on the same normal having the smallest distance to the adapted surface.

The distance is defined with respect to a distance measure. The distance measure depends on the geometrical distance of the respective extremum to the adapted forward projected surface on the respective normal in the image space or in the detection data space. In this embodiment, the distance measure is equal to the geometrical distance on the respective normal. In another embodiment, the distance measure can be a linear combination of the geometrical distance of an extremum to the forward projected surface in the image space or in the detection data space on the respective normal and of the absolute gradient value of the respective extremum or of the measured detection data located at the position of the respective extremum in the detection data space.

Figure 7:
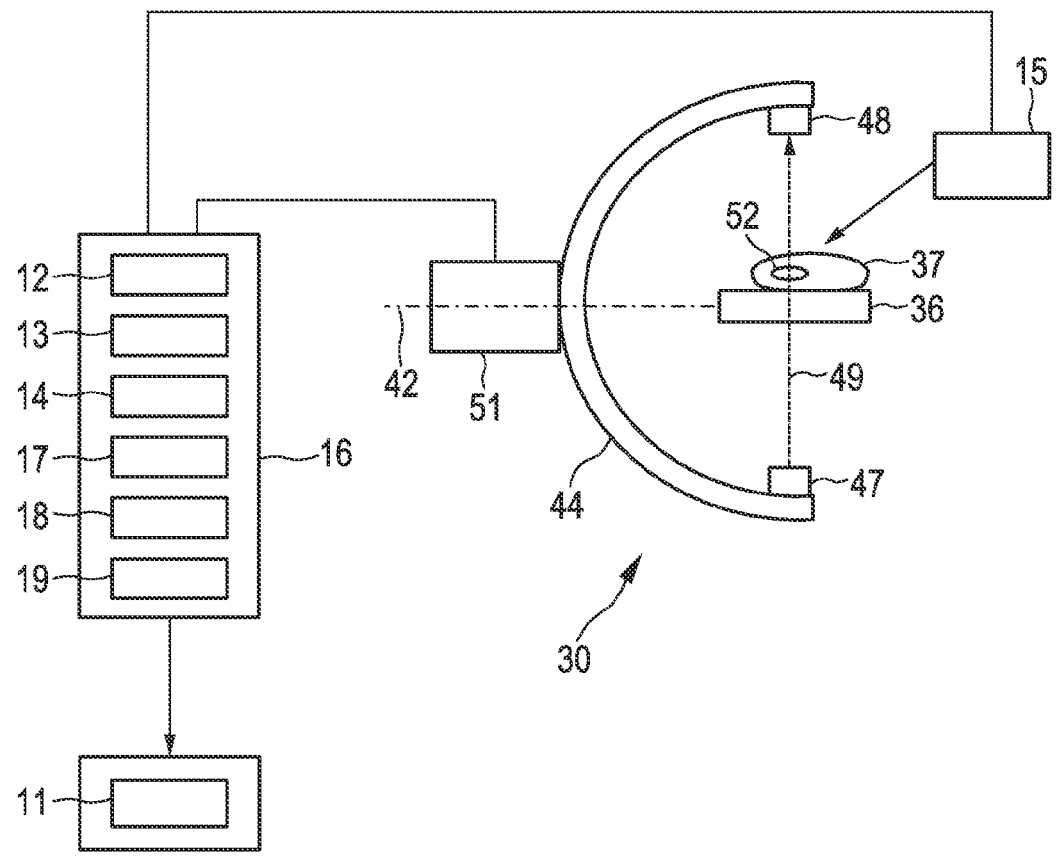
FIG. 7 shows schematically and exemplarily an apparatus for generating an image of a moving object and
  FIG. 8 shows schematically and exemplarily a C-arm unit being a part of an embodiment of an apparatus for generating an image of a moving object.

FIG. 7 shows schematically and exemplarily a further embodiment of an apparatus for generating an image of the moving object. In this embodiment, the apparatus for generating an image of the moving object comprises a C-arm unit 30. The C-arm unit 30 comprises an arm 44, which is preferably a C-shaped arm and which can make revolving motions around different axes of rotation, whereby the moving object 52, which is, in this embodiment, a heart 52 of a human being 37, is located at a fixed location between two ends of the C-shaped arm 44. The revolving motion, whereby the axis of rotation 42 is located in the plane of the C-shaped arm 44 and passes the C-shaped arm 44 through its central part, can be named as a propeller motion. A revolving motion, whereby the axis of rotation is positioned perpendicular to the plane of the C-shaped arm 44 and which axis passes that plane between the two ends of the C-shaped arm 44, can be named as a circular rotation. In general, all other revolving motions around other axes of rotation are possible.

An X-ray source 47 at one end of the C-shaped arm 44 emits X-rays, which X-rays are directed towards the moving object 52. A portion of the X-rays is absorbed in the moving object and, in this embodiment, in the human being 37, and the reminder of the X-rays is received by an X-ray detector 48 at the other end of the C-shaped arm 44, wherein the X-ray detector 48 preferentially comprises an image intensifier in order to intensify the detected X-rays. During an acquisition of measured detection data the C-arm 44 rotates and the X-ray source 47 emits X-rays, which traverse the moving object 52 and which are detected by the X-ray detector 48 after having traversed the moving object 52. The C-arm unit 30 is controlled by a control unit 51.

The apparatus for generating an image of a moving object shown in FIG. 7 further comprises a motion determination unit 15, an image generation unit 16 and a display unit 11, which are similar to the motion determination unit, the image generation unit and the display unit shown in FIG. 1. For a more detailed description of these elements it is referred to the above given description with respect to FIG. 1.

Figure 8:
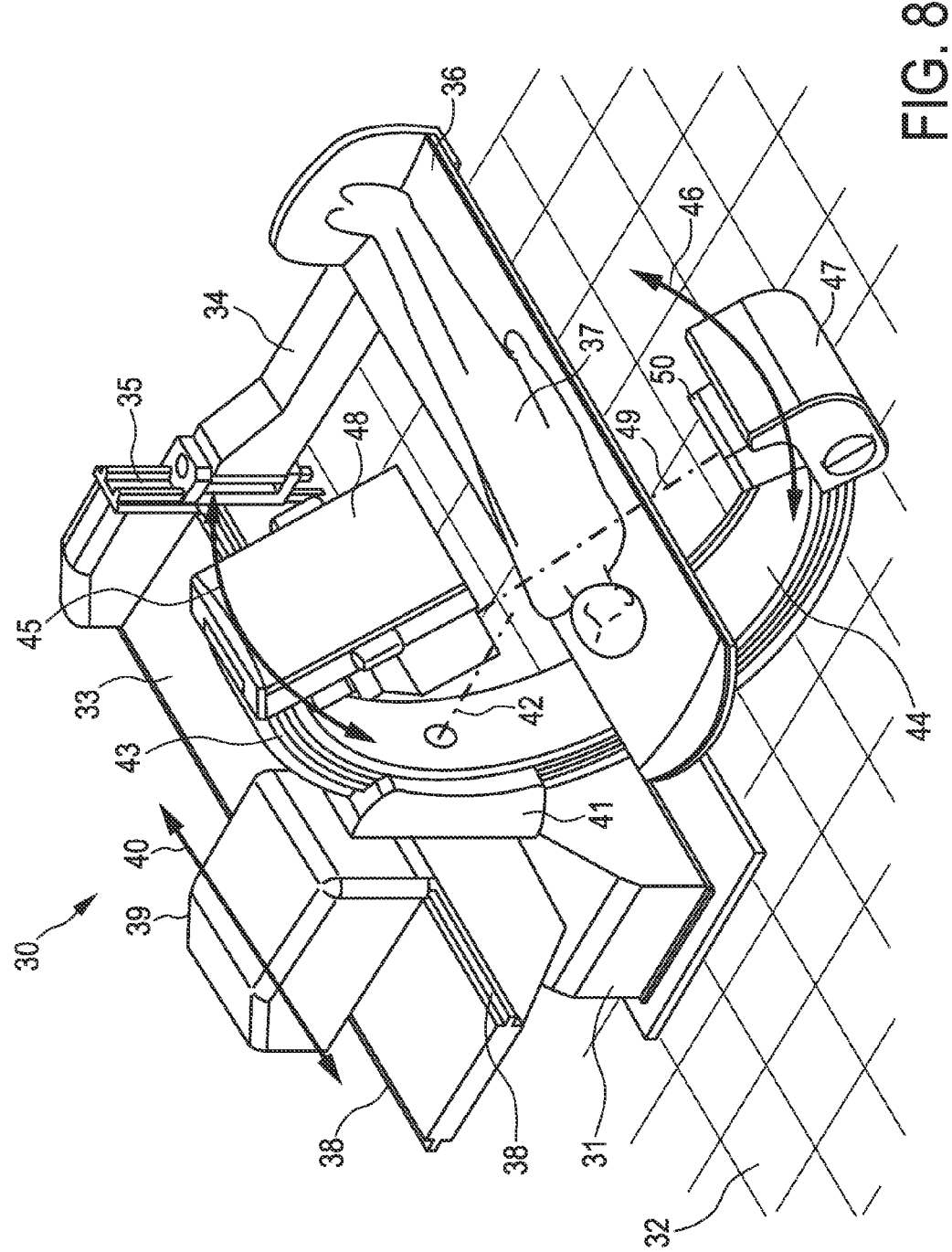

The C-arm unit 30 is schematically and exemplarily shown in more detail in FIG. 8.

The C-arm unit 30 comprises a supporting frame 31 mounted to a floor 32 of a room, for example, a medical treatment room. The supporting frame 31 comprises a horizontally extending part 33. A horizontal supporting arm 34 is attached to one end of the horizontally extending part 33 through vertical guiding rails 35, so that the supporting arm 34 can be moved up and down in vertical direction. The end of the supporting arm 34 carries a patient table 36 for supporting a patient, in particular, a human being 37.

The horizontal extending part 33 of supporting frame 31 is provided with horizontal extending guiding rail 38, which guiding rail 38 are engaged by sliding frame 39 that can move over the horizontal extending part 33, as is indicated with arrow 40. A rotating frame 41 is attached to the sliding frame 39, and the rotating frame 41 can revolve with respect to the sliding frame 39 around a horizontal axis 42, as is indicated with arrows 45 and 46.

The rotating frame 41 engages circular guiding rails 43 of the C-shaped arm 44, so that the C-shaped arm 44 can make a revolving motion around an axis, which is directed perpendicular to the plane through the C-shaped arm 14, i.e. in FIG. 8 the longitudinal direction of the patient table 36.

In FIG. 8, the X-ray source 47 is attached to the lower end of the C-shaped arm 14, and the X-ray detector 18 is attached to an upper end of the C-shaped arm 14. The X-ray source 47 emits a beam of X-rays in the direction of the X-ray detector 18 as is indicated by the striped line 49. The beam of X-rays is preferentially a cone beam. In other embodiments, the beam of X-rays can also be a fan beam. At least a portion of the X-rays passes through the moving object 52 and the X-ray detector 48 detects measured detection data depending on the intensity of the X-rays after having traversed the moving object 52.

The X-ray source 47 comprises a housing containing an X-ray tube. An X-ray attenuator 50 is attached to said housing, so that the X-rays that are emitted by the X-ray tube, pass the attenuator 50 before they leave the X-ray source 47. In other embodiments, the attenuator 50 can be omitted.

If the embodiment shown in FIGS. 7 and 8 is used for generating an image of a moving object, the C-shaped arm 42 rotates around the moving object 52 and measured detection data are acquired from different directions. Simultaneously, the motion determination unit 15, which is preferentially an electrocardiograph, measures motion data, which indicate the moving phases of the moving object 52. Preferentially, the motion determination unit 15 measures an electrocardiogram. The measured detection data are assigned to the moving phases by using the motion data determined by the motion determination unit 15, in particular, by using the electrocardiogram. Preferentially, the measured detection data cover an angular range of 180-220°, wherein within this angular range preferentially 120-220 projections are acquired. A projection is defined as the group of projection data, which have been acquired at the same time.

The C-arm unit 30 in combination with the motion determination unit 15 provides measured detection data of the moving object, which have been detected by using a detection process and which are assigned to the moving phases. This combination of the C-arm unit 30 and the motion determination unit 15 can therefore be regarded as a measured detection data providing unit.

After the measured detection data assigned to the moving phases have been provided, the above described steps 102 to 107, 201 to 204 and 301 to 304 can be performed.

By using an embodiment of the apparatus or method for generating an image of a moving object in accordance with the invention, an image of a moving object is generated, in particular, a four-dimensional image of the moving object, which can, for example, be used in X-ray guided electrophysiological interventions, like ablation procedures in the left atrium and the pulmonary veins of a heart of a human being or of an animal, in particular, as a road map for navigating through the heart with a catheter or with another element. Furthermore, the generated image of the moving object can be used to derive functional data from this generated image, for example, to derive wall motion behavior, ejection fraction etc. of a heart of a human being or of an animal. Furthermore, the generated image, which includes the movement of the moving object, can be used for a motion compensated reconstruction based on a surface motion vector field derived from the generated image of the moving object.

Preferentially, before acquiring the measured detection data, a contrast agent is injected into the moving object, in particular, into the heart of a human being or an animal, in order to allow to reconstruct the image object as the contrast agent located in the moving object.

Although in the above described embodiments, the moving object is preferentially a heart of a human being or of an animal, in other embodiments, the moving object can be any other moving object, in particular, any other periodically moving object. For example, the moving object can be another organ of a human being or of an animal or a technical object.

The moving object, which is shown in the generated image, can be a whole object or a part of an object. For example, the moving object, which is shown in the generated image, can be a whole heart of a human being or of an animal or a part of a heart of a human being or of an animal, for example, a whole moving heart wall or a part of a moving heart wall.

Although in the above described embodiments, certain adaptation procedures for adapting the image object are used, in other embodiments other adaptation procedures can be used, which allow to decrease the difference between measured detection data and simulated detection data, which are determined by simulating the detection process, which has been used for detecting the measured detection data, with the image object. For example, the well known energy minimization or maximization procedure can be used, wherein an energy term is minimized or maximized, which comprises an internal energy and an external energy. The internal energy is closer to an extremum, a minimum or a maximum, if the adapted image object is closer to the initial shape or a predefined shape, i.e. the internal energy tries to maintain the original shape. The external energy is closer to an extremum, a maximum or a minimum, if the simulated detection data are closer to the measured detection data, i.e. the external energy tries to modify the shape of the image object such that the simulated detection data correspond to the respective measured detection data. In another embodiment, the adaptation procedure can be adapted such that the image object is adapted such that the difference between the measured detection data and the simulated detection data is as small as possible. This difference is, for example, defined as the sum of squared differences of corresponding measured detection data values and simulated detection data values, i.e., for example, which correspond to the same location on a detection surface of a detection unit and to the same detection geometry, for example, to the same radiation source position.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or unit may fulfill the functions of several items recited in the claims. The mere fact that certain measures are recited in mutually different dependent claims does not indicate that a combination of these measures cannot be used to advantage.

Calculations, like a forward projection or the calculation of a gradient, and determinations performed by one or several units or units can be performed by any other number of units or units. For example, the steps performed by the measured detection data median filtering unit, the reconstruction unit, the image object filtering unit, the segmentation unit and the adaptation unit can be performed by a single unit or by any other number of different units. The calculations and deter-

The invention claimed is:

1. Apparatus for generating an image of a moving object, wherein a movement of the object comprises a plurality of moving phases, the apparatus comprising:
 a measured detection data providing unit (20) providing measured detection data of the moving object, which have been detected by using a detection process and which are assigned to the moving phases,
 a reconstruction unit (13) reconstructing an image object of the object from the provided measured detection data, wherein the image object represents at least a part of the moving object,
 an adaptation unit (18) for adapting the image object for different moving phases by adapting simulated detection data to the measured detection data of the respective moving phase, wherein the simulated detection data are determined by simulating the detection process, which has been used for detecting the measured detection data assigned to the respective moving phase, with the image object;
  wherein the measured detection data are measured projection data and wherein the adaptation unit (18) performs, for each moving phase, the steps of:
   simulating the detection process by forward projecting the image object, wherein simulated detection data are determined,
   determining a forward projected surface of the image object in the simulated detection data,
   determining a contour in the measured projection data by determining extremes of a gradient of the measured projection data, the extremes being determined along normals of the forward projected surface and form the contour, and
   modifying the image object to match the forward projected surface of the image object to the contour in the measured projection data.

2. Apparatus as defined in claim 1, wherein the reconstruction unit is reconstructs the image object without considering the assignment of the provided measured detection data to the moving phases.

3. Apparatus as defined in claim 1, wherein the apparatus further comprises a measured detection data median filtering unit (12) performing median filtering of the measured detection data.

4. Apparatus as defined in claim 1, wherein the apparatus further comprises an image object filtering unit (14) performing at least one of median and low-pass filtering of the image object.

5. Apparatus as defined in claim 1, wherein the apparatus further comprises a segmentation unit (17) for segmenting a surface of the image object, wherein the adaptation unit (18) adapts the image object by adapting the segmented surface of the image object.

6. Apparatus as defined in claim 1, wherein the adaptation unit determines a contour in the measured projection data and adapts the image object such that the forward projected surface of the image object is adapted to the contour in the measured projection data by performing following steps:
 a) determining extremes of the gradient of the measured projection data along several normals of the forward projected surface of the image object,
 b) determining for each normal the extremum having the largest absolute value,
 c) adapting the image object such that the forward projected surface of the image object is adapted to the determined extremes having the largest absolute value,
 d) determining whether on a same normal a determined extremum has a smaller distance with respect to a distance measure, which depends on the geometrical distance of the respective extremum to the adapted forward projected surface, than the extremum having the largest absolute value, wherein, if this is the case, the adaptation of the image object such that the forward projected surface of the image object is adapted to the determined extremes is repeated, wherein the extremum having the largest absolute value is replaced by the extremum on the same normal having the smallest distance with respect to the distance measure.

7. Apparatus as defined in claim 1, wherein the adaptation unit
 adapts the image object for different moving phases such that at least two adapted image objects are obtained related to two different moving phases,
 determines an adapted image object for a moving phase, for which an adapted image object has not been determined, by averaging over the at least two adapted image objects.

8. Method for generating an image of a moving object, wherein a movement of the object comprises a plurality of moving phases, the method comprising following steps:
 providing measured detection data of the moving object, which have been detected by using a detection process and which are assigned to the moving phases, by a measured detection data providing unit (20),
 reconstructing an image object of the object from the provided measured detection data by a reconstruction unit (13), wherein the image object represents at least a part of the moving object,
 an adaptation unit (18) for adapting the image object for different moving phases such that simulated detection data are adapted to the measured detection data of the respective moving phase, wherein the simulated detection data are determined by simulating the detection process, which has been used for detecting the measured detection data assigned to the respective moving phase, with the image object;
  wherein the measured detection data are measured projection data and wherein the adaptation unit (18) performs, for each moving phase, the steps of:
   simulating the detection process by forward projecting the image object, wherein simulated detection data are determined,
   determining a forward projected surface of the image object in the simulated detection data,
   determining a contour in the measured projection data by determining extremes of a gradient of the measured projection data, the extremes being determined along normals of the forward projected surface and form the contour, and
  modifying the image object to match the forward projected surface of the image object to the contour in the measured projection data.

9. A non-transitory computer readable medium encoded thereon computer executable program code for generating an image of a moving object, wherein a movement of the moving object comprises a plurality of moving phases, the computer executable program code comprising:
- providing measured detection data of the moving object, which have been detected by using a detection process and which are assigned to the moving phases, by a measured detection data providing unit,
- reconstructing an image object of the object from the provided measured detection data by a reconstruction unit, wherein the image object represents at least a part of the moving object,
- adapting the image object for different moving phases such that simulated detection data are adapted to the measured detection data of the respective moving phase, wherein the simulated detection data are determined by simulating the detection process, which has been used for detecting the measured detection data assigned to the respective moving phase, with the image object;
- wherein the measured detection data are measured projection data and wherein the adaptation unit performs for each moving phase, the steps of:
- simulating the detection process by forward projecting the image object, wherein
- simulated detection data are determined,
- determining a forward projected surface of the image object in the simulated detection data,
- determining a contour in the measured projection data by determining extremes of a gradient of the measured projection data, the extremes being determined along normals of the forward projected surface and form the contour, and modifying the image object to match the forward projected surface of the image object to the contour in the measured projection data.

* * * * *